(12) United States Patent
Nakajima

(10) Patent No.: US 7,350,151 B1
(45) Date of Patent: Mar. 25, 2008

(54) DISPLAY STATE AND/OR CELL BASED USER INTERFACE PROVISION METHOD AND APPARATUS

(75) Inventor: Satoshi Nakajima, Redmond, WA (US)

(73) Assignee: UI Evolution, Inc., Bellevue, WA (US)

( * ) Notice: Subject to any disclaimer, the term of this patent is extended or adjusted under 35 U.S.C. 154(b) by 836 days.

(21) Appl. No.: 09/661,598

(22) Filed: Sep. 14, 2000

(51) Int. Cl.
*G06F 3/00* (2006.01)
*G06F 15/16* (2006.01)

(52) U.S. Cl. ..................... 715/762; 715/205

(58) Field of Classification Search ............. 345/797, 345/749, 762, 744, 738, 760, 764; 715/501.1, 715/747, 749, 762, 744, 738, 760, 764, 205, 715/234; 717/107, 108, 114, 115, 116, 117, 717/118, 120
See application file for complete search history.

(56) References Cited

U.S. PATENT DOCUMENTS

| 5,483,651 | A | * | 1/1996 | Adams et al. | .................. 707/1 |
| 5,844,556 | A | * | 12/1998 | Takitani et al. | ............. 345/764 |
| 6,178,432 | B1 | * | 1/2001 | Cook et al. | .................. 715/513 |
| 6,222,537 | B1 | * | 4/2001 | Smith et al. | ................. 345/762 |

OTHER PUBLICATIONS

Definition of "pseudo-." Merriam Webster's Collegiate Dictionary, Tenth Edition. Merriam-Webster Inc. 2001.*
"Wireless Application Protocol Wireless Markup Language Specification." Version Apr. 30, 1998. Wireless Application Protocol Forum, Ltd. 1998.*
WAPWML, WAP-191-WML "Wireless Application Protocol, Wireless Markup Language Specification", Version 1.3, Wireless Application Protocol Forum, Ltd 2000 (41 pages).

* cited by examiner

*Primary Examiner*—Tadesse Hailu
*Assistant Examiner*—Blaine Basom
(74) *Attorney, Agent, or Firm*—Schwabe, Williamson & Wyatt, P.C.

(57) ABSTRACT

"An User Interface provision method involving the use of display state and/or display cells, and apparatuses equipped to practice the method, are described herein."

24 Claims, 7 Drawing Sheets

Server Side

Client Side

102ac

Card Game ~ 202

You Lose ~ 204c 206   208b   206

102ad

Card Game ~ 202

Draw ~ 204d 206   208c

DISPLAY STATE AND/OR CELL BASED USER INTERFACE PROVISION METHOD AND APPARATUS

BACKGROUND OF THE INVENTION

1. Field of the Invention

The present invention relates to the fields of data processing. More specifically, the present invention relates to the provision of user interfaces.

2. Background Information

With advances in integrated circuit, microprocessor, networking and communication technologies, increasing number of devices, in particular, digital computing devices, are being networked together (wirelessly or via wire lines). As a result of this trend of increased connectivity, increasing number of client/server based and network dependent applications are being deployed. Examples of these client/server based and network dependent applications include but are not limited to, email, net based telephony, world wide web and various types of e-commerce.

Among the client/server based and network dependent applications, thin-client architecture, also known as web-client architecture, perhaps because of its "ease of implementation" on the client side, is especially popular. Typically, the architecture merely involves a "user-agent", such as a Web browser or a WAP (Wireless Access Protocol) Browser, on the client side. There is no need for the client to have any application specific programs installed. Application specific logics are run on the server side, and the client just has to run the "user-agent" to render the user interface (where each instantiation is often referred as a "page" or a "web page"). The "user-agent" retrieves, for each instantiation of a user interface, a set of descriptions for the particular instantiation from the server, and renders the instantiation on a display screen as specified by the retrieved descriptions. The retrievals are made in response to a user's interaction with a current instantiation of the user interface, such as clicking a hyperlink or filling a form. The retrievals to be made are specified (as part of the descriptions) for the "user-agent" for each potential interaction, without requiring the "user-agent" to make any determination. The descriptions (including subsequent retrieval specifications) are typically authored in a "user-agent" specific language, such as HTML (Hypertext Markup Language) for Web browser, HDML/WML (Handheld Device Markup Language or Wireless Markup Language) for WAP browser.

Although this thin-client architecture allows the application programmers to implement a variety of applications, user experiences are generally poorer than user experiences with other conventional rich client applications (such as Office available from Microsoft of Redmond, Wash.). One of the reasons is because of the latency involved in the real time retrieval of each next set of definitions across the network. The user often has to wait while the retrieval is being made under the confine of limited networking/communication as well as server bandwidths, which may take upwards of seconds or more. This problem is often referred to as the "user interface latency" problem.

To solve this problem, "scripts" were introduced for HTML and WAP browsers. Script enabled "user-agents" allow authors of thin-client applications to embed some programs (a series of executable instructions) described in scripting-language (such as JavaScript or WMLScript), which give instructions to the "user-agents" on how to handle the user's input, without necessarily having to access the server, and retrieve the next set of user interface descriptions.

Although "scripting" was a sufficient solution for a certain set of user interactions (such as verifying that the user filled a certain field before submitting that data to the server), it significantly added the complexity to the development of thin client applications. Scripting is also not suitable when complex computations are required (such as determining the response to a user's move in a chess game), because of the limited resources on the client devices as well as the limitation of the script language itself.

HDML (and its successor, WML) introduced the concept of "cards and decks", which allows the "user-agent" to retrieve multiple sets of user interface descriptions in a single round-trip. Each card describes a single unit of interaction including information to be presented to the user, and instructions for user inputs. A user essentially interacts or navigates through a series of cards. Multiple cards may be organized into a deck, which is equivalent to an HTML page. Although it reduces the number of round-trips in a certain set of scenarios, because it requires one card for each possible set of user interactions, it is not possible to apply this technology when the possible number of units of interactions is large or near infinite, as the number of user interface descriptions and their corresponding contents retrieved are large or near infinite. For example, if a user interface has 100 possible sets of user interactions, the descriptions of 100 cards must be retrieved in one round-trip or these descriptions must be separated into multiple decks and retrieved separately. Thus, the user still experience delays either due to the large amount of data to be transmitted in a single round trip or having to make multiple round trips.

Thus, what is needed is a new approach to provisioning user interface, that is more powerful in addressing large possible responses by the user, and allowing the solution to be client based (thereby eliminating the latency), but without the limitations and disadvantages of the prior art.

SUMMARY OF THE INVENTION

In accordance with a first aspect of the present invention, a user interface is provisioned by a client device locally determining a next display state of the user interface, and the next instantiation of the user interface is provisioned by the client device in accordance with one or more display state definitions corresponding to the determined display state, specifying constituting contents of the user interface for the determined display state. In one embodiment, each of the one or more display state definitions includes display state transition rules for various user interactions with the user interface.

In accordance with a second aspect of the present invention, a user interface is provisioned by a client device generating a first portion of a first instantiation of the user interface in accordance with a display cell definition specifying constituting contents of a display cell, and generating a second portion of a second instantiation of the user interface in accordance with the display cell definition, which also specifies the constituting contents of the display cell for the second portion of the second instantiation. That is, a display cell definition may specify a display cell for multiple display states. In one embodiment, the display states are multi-dimensional.

Further, in one embodiment, the display state transition rules are specified at the display cell level. In one embodiment, a display cell may also inherit constituting contents from another display cell. A display cell may even be a pseudo display cell.

In one embodiment, an application server is provided with a user interface provision function incorporated with the state and/or cell based approach to user interface provisioning. The application server, in response to a remote client device's request for a user interface, transmits to the remote client device the state and/or cell based definitions and the constituting contents for the different instantiation of the user interface. In one embodiment, a server is provided to host the application server having the user interface provision function of the present invention.

In one embodiment, a user agent is provided with a user interface provision function incorporated with the state and/or cell based approach to user interface provisioning. In one embodiment, a client device selected from a device group consisting at least a wireless telephone, a palm sized computing device, and a notebook sized computing device, is provided to host the user agent having the user interface provision function of the present invention.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as user interfaces, buttons, and so forth, commonly employed by those skilled in the art to convey the substance of their work to others skilled in the art. Parts of the description will be presented in terms of operations performed by a computing device, using terms such as clicking, determining, rendering, and so forth. As well understood by those skilled in the art, these quantities and operations take the form of electrical, magnetic, or optical signals capable of being stored, transferred, combined, and otherwise manipulated through mechanical and electrical components of a digital system. The term digital system includes general purpose as well as special purpose computing machines, systems, and the like, that are standalong, adjunct or embedded.

Various operations will be described in turn in a manner that is most helpful in understanding the present invention, however, the order of description should not be construed as to imply that these operations are necessarily order dependent. Furthermore, the phrase "in one embodiment" will be used repeatedly, however the phrase does not necessarily refer to the same embodiment, although it may.

Figure 1:
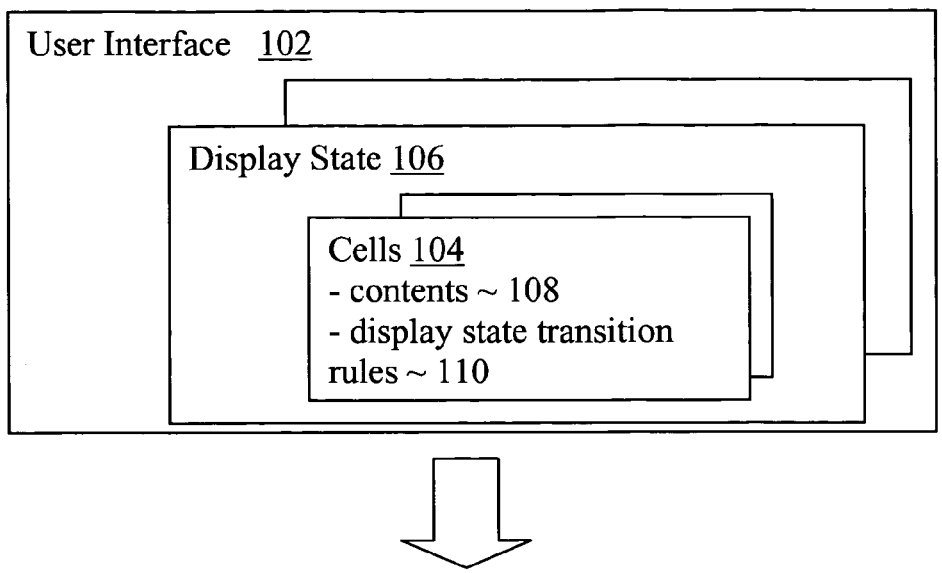
FIG. 1 illustrates an overview of the present invention, in accordance with one embodiment.
Figure 1:
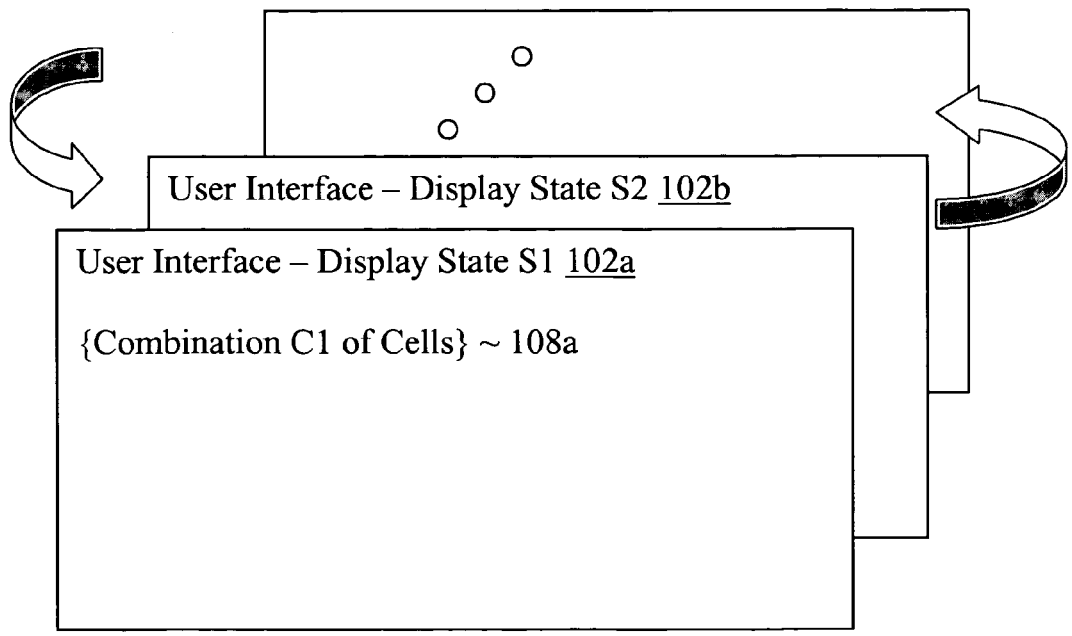

Referring now to FIG. 1, wherein a block diagram illustrating an overview of the present invention, in accordance with one embodiment is shown. As illustrated, in accordance with one aspect of the present invention, a user interface 102 is provisioned through the employment of display states defined by display state definitions 106. Each display state definition 106 includes specification 108 for the constituting contents (not shown) for an instantiation (or portion thereof) of user interface 102, e.g. 102a, 102b, and so forth, and display state transition rules 110, specifying the next display state (or instantiation) of user interface 102 in the event of user interactions with the displayed content.

In accordance with another aspect of the present invention, a user interface 102 is provisioned through the employment of display cells correspondingly defined by display cell definitions 104. Each display cell definition 104 includes specification 108 for the constituting contents (not shown) of the display cell. The display cell may be displayed in different instantiations (or display states) of the user interface. That is, a display cell definition may specify a display cell for one or more display states.

For the illustrated embodiment, both aspects of the present invention are practiced. More specifically, each display state definition 108 includes applicable ones of the display cell definitions 104, and each display cell definition 104 includes specification 110 for a display state transitional rule, specifying the next display state (or instantiation) of user interface 102 in the event a user interacts with the rendered display cell 104 being defined. As will be described in more detail below, the present invention advantageously allows the display states to be of one or more dimensions. Further, a display cell may inherit its constituting contents from another display cell, which may be a pseudo display cell. Together, these characteristics advantageously provide for a much more compact approach in defining the different instantiations of a user interface.

While FIG. 1 illustrated a "nested" embodiment, with each display state definition 106 including one or more display cell definitions 104, and each of a number of selected ones of the display cell definitions 104 including display state transition rules 110, the present invention contemplates that in alternate embodiments, display states, display state transitional rules, and display cells may all be independently defined, and cross referenced to each other (or some combinations thereof), as opposed to the "nested" approach of FIG. 1.

Thus, under the present invention, each instantiation of the user interface, 102a, 102b, etc. may be provisioned by a client device generating the different portions of the instantiation in accordance with the corresponding display cell definitions specifying constituting contents of the corresponding display cells of the instantiation. In one embodiment, display state definitions 106 (inclusive with display cells specifications 106 having display state transition rules 110), and constituting contents of the display cells, are "pre-provided" from the server side to the client side. The client side locally determines a next display state of user interface 102, and the next instantiation, e.g., 102a and 102b, is provisioned by the client device in accordance with the "display state definition/definitions" of the determined display state.

[Note that "pre-provision" may be made in stages, e.g. with the initial definitions and contents being provided first, and subsequent definitions and contents being provided in parallel while the initial instantiation is being rendered and during the "think time" of the initial instantiation. Other variations of staged "pre-provision" may also be practiced.]

Thus, the present invention advantageously allows the client device to locally determine and renders different instantiations of a user interface, without having to make the often time consuming real-time retrievals from an application server, in between instantiations of an user interface. Moreover, as alluded to earlier, the advantages are made possible in a very compacted approach. As will be even more readily apparent from the descriptions to follow, the state and/or cell based approach of the present invention to specifying the different instantiations of an user interface is highly scalable and because of its compactness, much more flexible in addressing situations where a relatively large number of user interactions are possible.

Referring now to FIGS. 2a-2d, wherein an example application of the present invention is illustrated. Illustrated therein are four instantiations of an user interface of a card game, where a user is to select one of three displayed cards. Depending on the selection, a user will either win, lose or draw. The example application is purposely kept simply for ease of understanding. Nevertheless, for one ordinarily skilled in the art, the key principles of the present invention are fully illustrated.

Figure 2A:
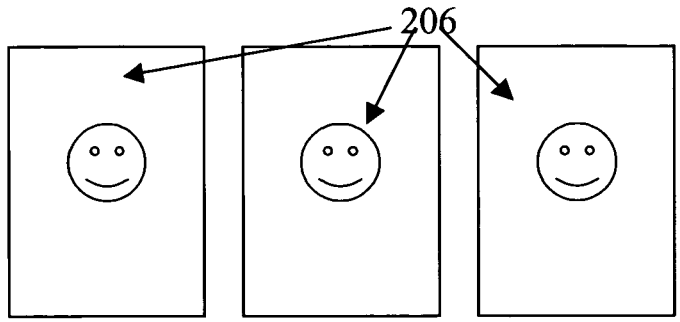
FIGS. 2a-2d illustrate different instantiations of a user interface of an example application.
Figure 2B:
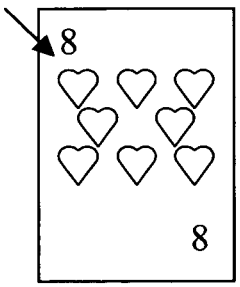
Figure 2B:
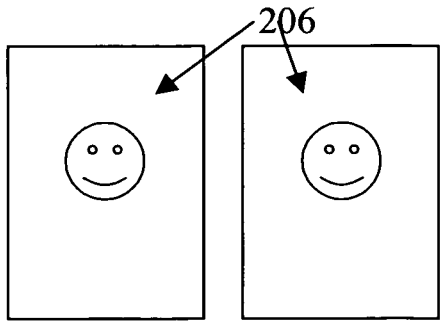

FIG. 2a illustrates an initial instantiation of the user interface 102aa of the card game, where the back side of three cards 206, along with the title of the game 202, and an instruction 204a for the player are rendered. FIG. 2b illustrates a second instantiation of the user interface 102ab of the card game, where the face of the first card 208a (selected by the user), the back side of the remaining two cards 206, along with the title of the game 202, and a "winning" message 204b for the player are rendered.

Figure 2C:
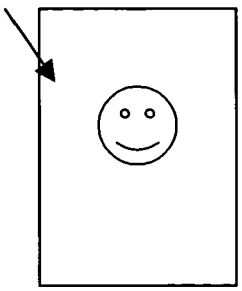
Figure 2C:
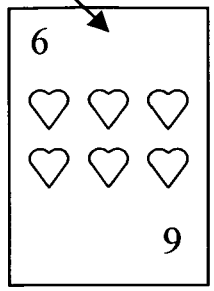
Figure 2C:
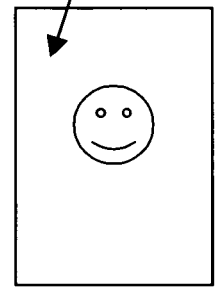
Figure 2D:
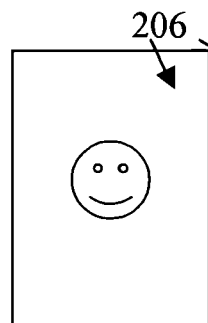
Figure 2D:
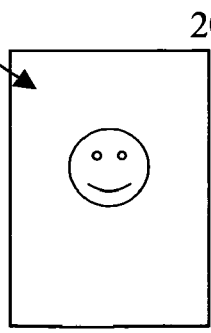
Figure 2D:
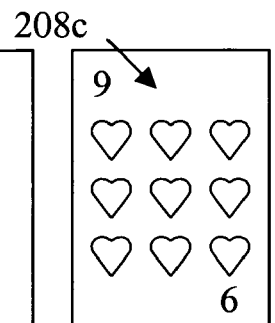

FIG. 2c illustrates a third instantiation of the user interface 102ac of the card game, where the face of the second card 208b (selected by the user), the back side of the remaining two cards 206, along with the title of the game 202, and a "losing" message 204c for the player are rendered. Finally, FIG. 2d illustrates a fourth instantiation of the user interface 102ad of the card game, where the face of the third card 208c (selected by the user), the back side of the remaining two cards 206, along with the title of the game 202, and a "draw" message 204c for the player are rendered.

Thus, in accordance with the present invention, the various instantiations of the user interface 102aa-102ad, the conditions under which they are rendered, and the transitions between the instantiations may be advantageously specified using (1) four display states, s1 through s4, where s1 is the initial "make a selection" state, s2 is the display state upon selection of the first card (i.e. the "win" state), s3 is the display state upon selection of the second card (i.e. the "lose" state), and s4 is the display state upon selection of the third card (i.e. the "draw" state);

(2) three transition rules, rule 1—transitioning from state s1 to state s2 on selection of the first card, rule 2—transitioning from state s1 to state s3 on selection of the second card, and rule 3—transitioning from state s1 to state s3 on selection of the third card; and (3) eleven display cells,
   a. cell 1 for the title of the game (which is visible in all states),
   b. cell 2 for the instruction of the game (which is visible in state 1),
   c. cell 3 for the back of the first card (which is visible in states 1, 3 and 4),
   d. cell 4 for the back of the second card (which is visible in states 1, 2 and 4),
   e. cell 5 for the back of the third card (which is visible in states 1, 2 and 3),
   f. cell 6 for the face of the first card (which is visible in state 2),
   g. cell 7 for the face of the second card (which is visible in state 3),
   h. cell 8 for the face of the third card (which is visible in state 4),
   i. cell 9 for the "winning" message (which is visible in state 2),
   j. cell 10 for the "losing" message (which is visible in state 3), and
   k. Cell 11 for the "draw" message (which is visible in state 4).

Further, in accordance with the illustrated embodiment, these specifications may be made using a number of cell definitions (with the display states and display state transition rules distributively defined therein). Enumerated below (with some details, e.g. positional specifications, omitted) is an example of such specifications in XML:

<States default="S=1">
    <State id="Title">
      <Cell type="text">Card game</Cell>
    </State>
    <State id="S=1" inherit "Title">
      <Cell type="text">Select a Card</Cell>
      <Cell type="img" src=back.jpg" onSelect="S=2"/>
      <Cell type="img" src=back.jpg" onSelect="S=3"/>
      <Cell type="img" src=back.jpg" onSelect="S=4"/>
    </State>
    <State id="S=2" inherit "Title">
      <Cell type="text">You win</Cell>
      <Cell type="img" src="eight.jpg"/>
      <Cell type="img" src="back.jpg"/>
      <Cell type="img" src="back.jpg"/>
    </State>
    <State id="S=3" inherit "Title">
      <Cell type="text">You lose</Cell>
      <Cell type="img" src="back.jpg"/>
      <Cell type="img" src="six.jpg"/>
      <Cell type="img" src="back.jpg"/>
    </State>
    <State id="S=4" inherit "Title">
      <Cell type="text"<Draw>/Cell>
      <Cell type="img" src="back.jpg"/>
      <Cell type="img" src="back.jpg"/>
      <Cell type="img" src="nine.jpg"/>
    </State>
    </States>

Note that in the above enumerated example, the notions of a pseudo display state and inheritance were also introduced to facilitate specification of the display of the title "Card Game" in each instantiation of the user interface. A pseudo display state "Title" is specified, and its constituting content ("Card Game") is inherited by each of the other display states. A pseudo display state is a display state that in and of itself does not get rendered to form an instantiation of the user interface. As a result, the user interface may be specified in a much more compact manner, reducing the transmission time and bandwidth required to retrieve the user interface For ease of understanding, the above example illustrated four display states, within a single dimension, the dimension of the win, lose or draw. However, the present invention specifically contemplates the display states may be multi-dimensional.

Consider for example, a new "betting" dimension, where $1, $5 or $10 bet may be placed, is added to the above described example Card Game. Along this "betting" dimension, the Card Game may be said to be in a state T0, where no bet has been placed, a state T1, where a $1 bet has been placed, in a state T2, where a $5 bet has been placed, and in a state T3, where a $10 bet has been placed. Accordingly, the various instantiations of the user interface can be said to correspond to the eleven "two dimensional" display states of (T0, x), (T1, S1), (T2, S1), (T3, S1), (T1, S2), (T2, S2), (T3, S2), (T1, S3), (T2, S3), (T3, S3), (z, S4). [It is assumed that the Game would not permit a win, lose or draw state, nor the choosing of a card, without a bet being placed. Thus, (T0, S1), (T0, S2), (T0, S3), and (T0, S4) are "illegal" or "impossible" states. Further, as long as the display state is in the draw state in the win, lose or draw dimension, it is immaterial as far as the amount of bet placed.]

Assume further that the user (player) is given a $100 at the beginning of the game, the various instantiations of the user interface may be specified by the following expanded XML specification:

```
<States default="T=0">
<State id="Title">
   <Cell type="text">Card game</Cell>
</State>
<State id="T=0" inherit "Title">
   <Cell type="text">You have a $100</Cell>
   <Cell type=text>Choose your bet</Cell>
   <Cell type="text" on Select="S=1 T=1">$1</Cell>
   <Cell type="text" on Select="S=1 T=2">$5</Cell>
   <Cell type="text" on Select="S=1 T=3">$10</Cell>
</State>
<State id="T1">
   <Cell type="text">Your bet: $1</Cell>
</State>
<State id="T2">
   <Cell type="text">Your bet: $5</Cell>
</State>
<State id="T3">
   <Cell type="text">Your bet: $10</Cell>
</State>
<State id="S=1" inherit "Title">
   <Cell type="text"<Select a Card</Cell>
   <Cell type="img" src="back.jpg" onSelect="S=2"/>
   <Cell type="img" src="back.jpg" onSelect="S=3"/>
   <Cell type="img" src="back.jpg" onSelect="S=4"/>
</State>
<State id="S=2" inherit "Title">
   <Cell type="text">You win></Cell>
   <Cell type="img" src="eight.jpg"/>
   <Cell type="img" src="back.jpg"/>
   <Cell type="img" src="back.jpg"/>
</State>
<State id="S=3" inherit "Title">
   <Cell type="text">You lose</Cell>
   <Cell type="img" src="back.jpg"/>
   <Cell type="img" src="six.jpg"/>
   <Cell type="img" src="back.jpg"/>
</State>
<State id="S=4" inherit "Title">
   <Cell type="text">Draw</Cell>
   <Cell type="img" src="back.jpg"/>
   <Cell type="img" src="back.jpg"/>
   <Cell type="img" src="nine.jpg"/>
   <Cell type="text">You have: $100</Cell>
</State>
<State id="T=1 && S=2">
   <Cell type="text">You have: $101</Cell>
</State>
<State id="T=2 && S=2">
   <Cell type="text">You have: $105</Cell>
</State>
<State id="T=3 && S=2">
   <Cell type="text">You have: $110</Cell>
</State>
<State id="T=1 && S=3">
   <Cell type="text">You have: $99</Cell>
</State>
<State id="T=2 && S=3">
   <Cell type="text">You have: $95</Cell>
</State>
<State id="T=3 && S=3">
   <Cell type="text">You have: $90</Cell>
</State>
</States>
```

In the immediate above example, it is assumed that if the display state value is specified for only one dimension, the display state value for the other dimension is "don't care". Thus, the specified display cells will get rendered as long as the display state value corresponds in the specified dimension. For example, for the display cells specified for display state "S=2", the display cells get rendered for display states (T1, S2), (T2, S2) as well as (T3, S2). In other words, the present invention also contemplates that a display cell definition may be specified for a display cell for one or more single or multi-dimension display states, thereby further increasing the compactness of the user interface definition or provisioning of the present invention, and the latency reduction benefits that results.

Figure 3:
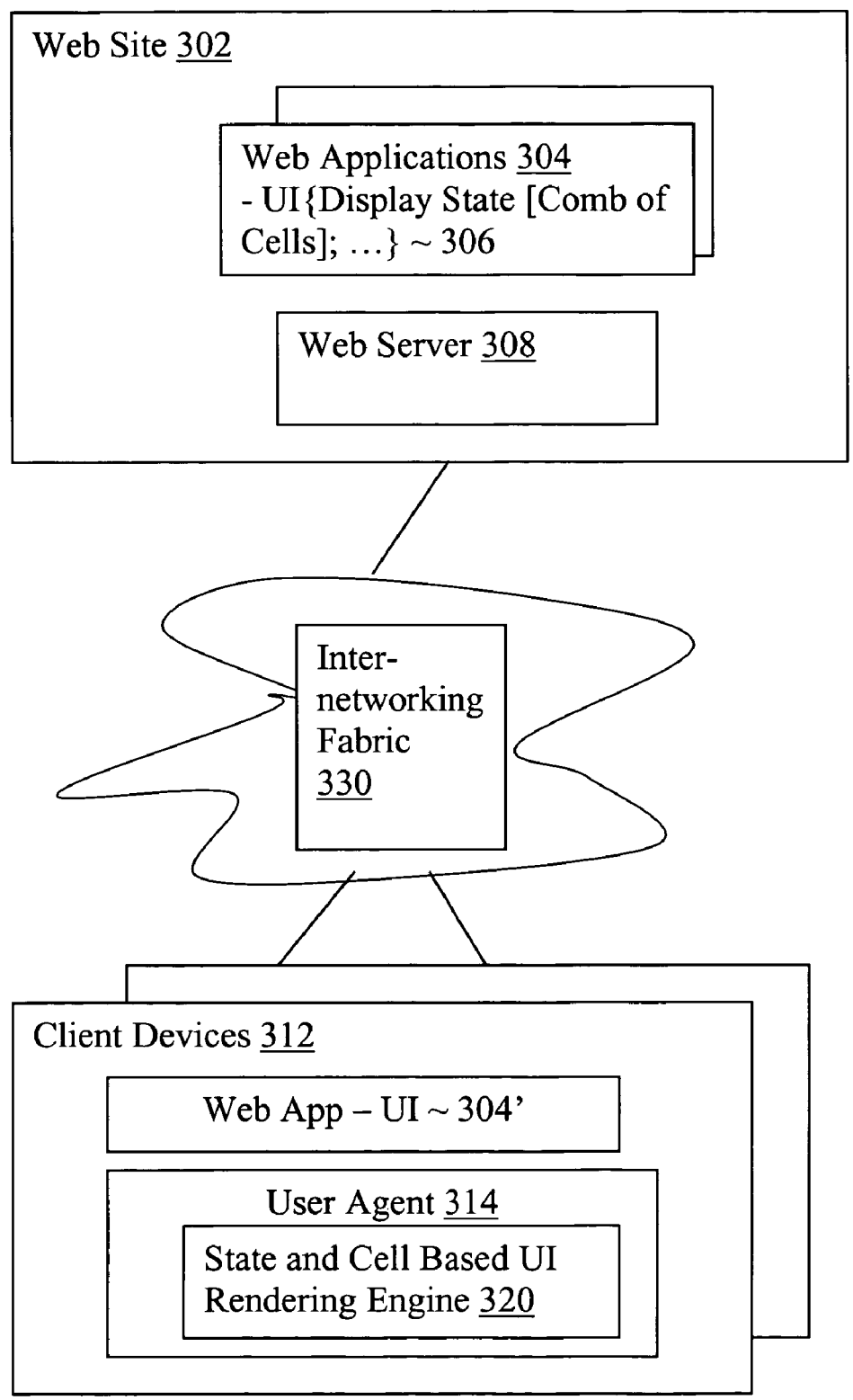
FIG. 3 illustrates an example network of clients and server devices suitable for practicing the present invention, in accordance with one embodiment.

Referring now to FIG. 3, where in an example network of client and server devices, suitable for use to practice the present invention is shown. As illustrated, client devices 312 are coupled to web site 302 via interworking fabric 330. Web site 302 includes web application 304 constructed in accordance with the teachings of the present invention. That is, the user interface of web application 304 is compactly constructed in accordance with the state and/or cell based approach of the present invention. Web application 304 is intended to represent a broad range of applications known in the art. Web site 302 further includes web server 308, which is also intended to represent a broad range of such servers known in art, for sending "pages" or "web pages" to coupled client devices 312, except in the present case, web server 308 includes a user interface provisioning function (not shown), equipped to "pre-provide" the instantiations of the user interface compactly defined in the state and/or cell based form, as described earlier.

Each of client devices 312 includes user agent 314, incorporated with the state and cell based user interface rendering engine 320 of the present invention. User agent 314, state and cell based user interface rendering engine 320 in particular, renders the state and/or cell based instantiations of user interface 304' as described earlier. User agent 314 may be a browser, an operating system, and the like. Client devices 312 are intended to represent a broad range of such devices known in the art, including but are not limited to wireless telephones, palm sized personal digital assistants (PDA), notebook sized computers, desktop computers, set top boxes and the like.

While for ease of understanding, only one web site 302 and two client devices 312 are illustrated, those skilled in the art will appreciate that the present invention may be practiced with one or more web sites 302 having selected combinations of any number of client devices 312 accessing applications with user interfaces constructed and rendered in accordance with the present invention.

Figure 4:
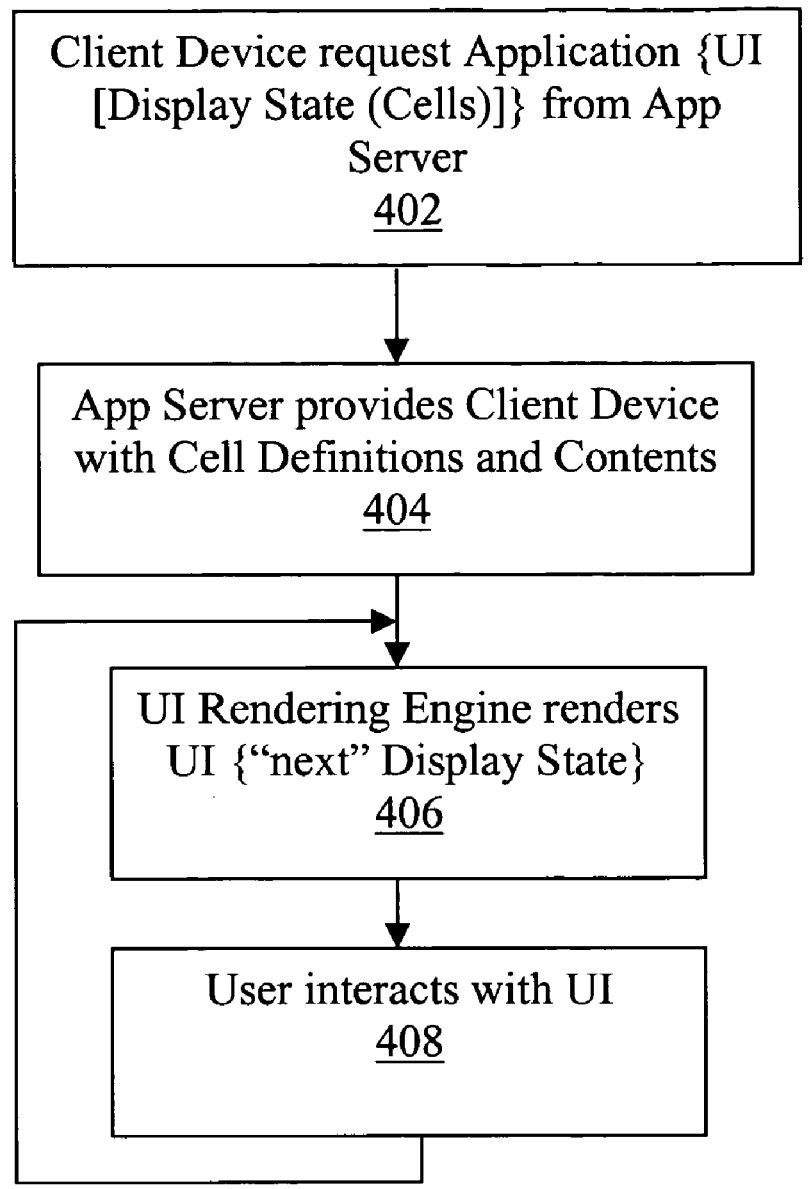
FIG. 4 illustrates a method view of practicing the present invention in the example network environment of FIG. 3.

Referring now to FIG. 4, wherein a method view of the present invention, in accordance with one embodiment, is shown. As illustrated, at block 402, a client device requests for an application from a remote application server. The user interface of the application is advantageously constructed in accordance with the state and/or cell based approach of the present invention. In response, at block 404, the application server provides the client device with the compactly defined display cell definitions for the various (single or multi-dimensional) display states of the user interface, along with the constituting contents of the display cells. At block 406, the user interface rendering engine (of the "user agent") of the client device determines the "next" display state, and renders the "next" instantiation of the user interface, in accordance with the "next" display state's definition, and using the constituting contents provided. [Note that the user interface rendering engine (of the "user agent") of the client device may render the "initial" instantiation of the user interface, as soon as the "initial" definitions and corresponding contents are provided. Thus, the present invention may be further advantageously practiced with the server providing the "initial" definitions and contents first.] At block 408, a user interacts with the current instantiation of the user interface. In response, the process continues back at block 406 again, that is the user interface rendering engine (of the "user agent") of the client device determines the "next" display state, and renders the "next" instantiation of the user interface, in accordance with the "next" display state's definition, and using the constituting contents provided.

Blocks 406 and 408 are repeatedly performed until eventually the user takes certain action which results in the dispensing of the user interface.

As those skilled in the art would appreciate, by virtue of the fact that the user interface may be compactly provided to the remote client device, the user interface may be provided initially with reduced latency. Further, thereafter, because the subsequent instantiations may be provided without having to access the remote server, each of these instantiations may be provided with significant reduction in latency, thereby significantly improving a user's experience.

Figure 5A:
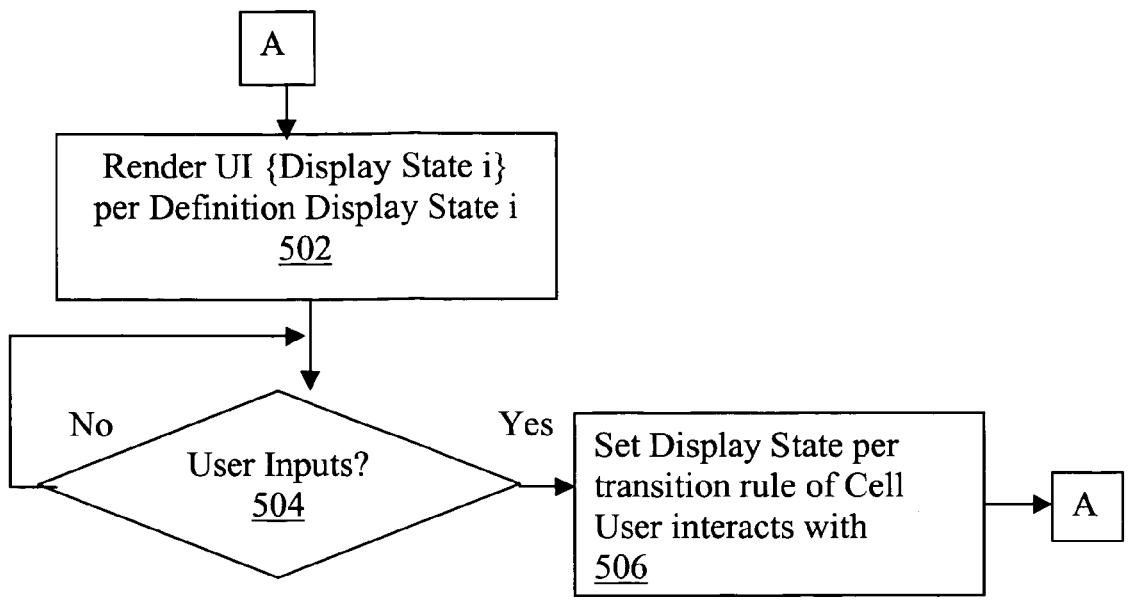
FIGS 5a-5b illustrate the operational flow of the relevant aspects of the user-agent of FIG. 3, in accordance with one embodiment.
Figure 5B:
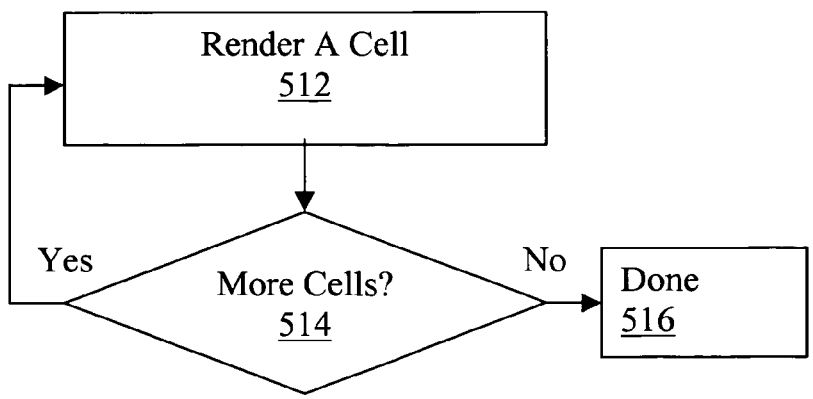

FIGS. 5a-5b illustrate the operational flow of the relevant aspects of the user interface rendering function of user agent 314 of FIG. 3. FIG. 5a, illustrates the overall process for rendering the various instantiations, whereas FIG. 5b illustrates the process for rendering a specific instantiation.

As illustrated in FIG. 5a, upon invocation, at block 502, the user interface rendering function renders the current instantiation of the user interface, in accordance with the display state definition/definitions for the determined current display state. Thereafter, at block 504, the user interface rendering function awaits for user inputs, i.e. user interaction with one of the rendered display cells. Upon detection of the user interaction, at block 506, the user interface rendering function sets the display state in accordance with the display state transitional rule specified for the rendered display cell, with which the user interacted. The process then continues back at block 502.

As illustrated in FIG. 5b, the user interface rendering function renders a current instantiation of the user interface, one display cell at a time, block 512. The process continues until all display cells specified for a display state have been rendered, block 514.

Figure 6:
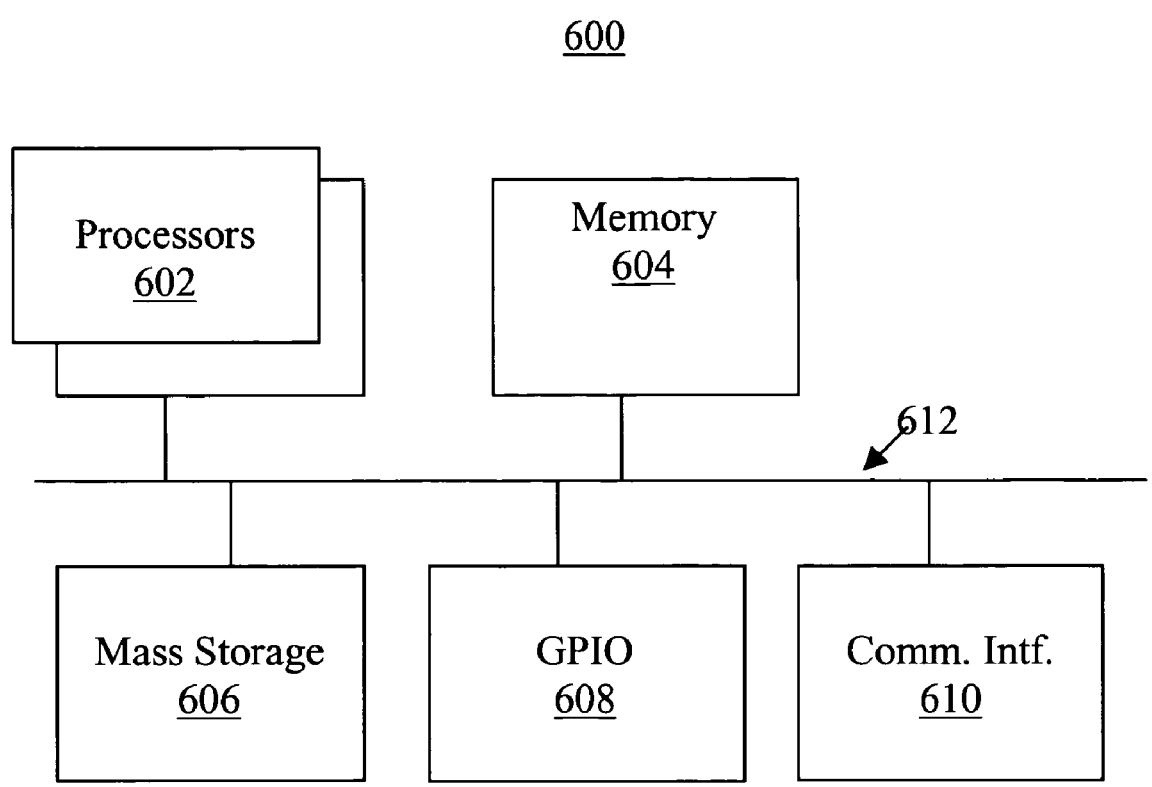
FIG. 6 illustrates an architectural view of an example computing device, suitable for use as either a client or a server device to practice the present invention, in accordance with one embodiment.

FIG. 6 illustrates an example computing device suitable for use to practice the present invention as a client or server device, in accordance with one embodiment. As shown, client/server 600 includes one ore more processors 602 and system memory 606. The number of processors and the size of memory employed are typically dependent on whether the example computing device 600 is used as a client or server device. For example, if used as a server device, probably multiple high performance processors are employed. On the other hand, if used as a wireless telephone, probably a lower performance micro-controller is used instead.

Additionally, device or system 600 includes mass storage devices 607 (such as diskette, hard drive, CDROM and so forth, again depending on whether it is used as client or a server device), GPIO 608 (for interfacing with I/O devices such as keyboard, cursor control and so forth) and communication interfaces 612 (such as network interface cards, modems and so forth). The elements are coupled to each other via system bus 614, which represents one or more buses. In the case of multiple buses, they are bridged by one or more bus bridges (not shown).

Each of these elements performs its conventional functions known in the art. In particular, system memory 604 and mass storage 606 are employed to store a working copy and a permanent copy of the programming instructions implementing the web server (in the case of a server device) or the user agent (in the case of the client device).

Except for its use to host the novel web server or user agent incorporated with the teachings of the present invention, the constitution of these elements 602-614 are known, and accordingly will not be further described.

Accordingly, a state and/or cell based method and apparatus for provisioning user interface has been described. While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
receiving by a client device, from a remote server, a plurality of display state definitions defining a plurality of instantiations of a user interface of an application for a plurality of display states of the user interface, wherein (1) at least one of the plurality of instantiations of the user interface corresponds to a multidimensional display state, the at least one instantiation defined by two or more of the plurality of display state definitions, and (2) at least two of the plurality of display state definitions including pluralities of display cell definitions correspondingly defining pluralities of display cells of at least one of the plurality of instantiations of the user interface, the at least two display state definitions being associated with a display state variable of a first of a plurality of display state dimensions, the display state variable being common to both, and each of the at least two display state definitions being associated with a different one of a plurality of discrete unequal display state values of the common display state variable, at least one display cell definition of one of the pluralities of display cell definitions having a transition rule that sets the common display state variable in response to user interaction with the display cell specified by the at least one display cell definition, said setting to facilitate determining by the client device a display state of the user interface;

examining locally by the client device, one or more display state variables of the display state dimensions to determine a current display state of the user interface; and provisioning by the client device, a current instantiation of said user interface in accordance with one or more of the display state definitions associated with the determined current display state.

2. The method of claim 1, wherein each display state definition has one or more display cell definitions correspondingly defining one or more display cells of at least one instantiation of the user interface, and said determining is locally made by said client device in accordance with a second display cell definition of a second of the display state definitions of the user interface for a second rendered display cell of an immediately preceding instantiation of the user interface for corresponding to an immediately preceding display state of an immediately preceding instantiation of the user interface, with which corresponding display cell a user interacted, said second display cell definition including a state transition rule that sets at least one of the one or more display state variables of the display state dimensions to at least one display state values to facilitate the client device in determining the current display state as the display state of the user interface in the event a user interacts with the corresponding second rendered display cell.

3. The method of claim 2, wherein said provisioning comprises generating by said client device a first display cell of the current instantiation of the user interface in accordance with a first of said one or more display cell definitions of one of said one or more display state definitions associated with said current display state.

4. The method of claim 3, wherein said provisioning further comprises generating by said client device a second display cell of the current instantiation of the user interface in accordance with a second of said one or more display cell definitions of the same or another of said one or more display state definitions associated with said current display state.

5. The method of claim 1, wherein said provisioning comprises generating by said client device a portion of the current instantiation of the user interface with constituting contents inherited from a pseudo instantiation of the user interface.

6. The method of claim 1, wherein said current display state is multi-dimensional.

7. A method comprising:
transmitting by a server to a remote client device, a plurality of display state definitions defining a plurality of instantiations of a user interface of an application for a plurality of display states of the user interface, wherein (1) at least one of the plurality of instantiations of the user interface corresponds to a multidimensional display state, the at least one instantiation defined by two or more of the plurality of display state definitions, and (2) at least two of the plurality of display state definitions including pluralities of display cell definitions specifying constituting contents for pluralities of corresponding display cells of at least one of the plurality of instantiations of the user interface, the at least two display state definitions being associated with a display state variable of a first of a plurality of display state dimensions, the display state variable being common to both, and each of the at least two display state definitions being associated with a different one of a plurality of discrete unequal display state values of the common display state variable, at least one display cell definition of one of the pluralities of display cell definitions having a transition rule that sets the common display state variables in response to user interaction with the display cell specified by the at least one display cell definition, said setting to facilitate determining by the remote client device a display state of the user interface; and transmitting by the server to said remove client device, said constituting contents for said pluralities of display cells for rending an instantiation of the plurality of instantiations of said user interface on said remote client device in accordance with one of said pluralities of display cell definitions.

8. The method of claim 7, wherein the constituting contents are constituting contents of a pseudo instantiation of the user interface to be inherited during said rendering.

9. An article of manufacture comprising:
a storage medium; and
a plurality of programming instructions stored in the storage medium and configured to implement a user interface provision function equipped to receive from a remote server a plurality of display state definitions defining a plurality of instantiations of a user interface of an application for a plurality of display states of the user interface, wherein (1) at least one of the plurality of instantiations of the user interface corresponds to a multidimensional display state, the at least one instantiation defined by two or more of the plurality of display state definitions, and (2) at least two of the plurality of display state definitions including pluralities of display cell definitions correspondingly defining pluralities of display cells of at least one of the plurality of instantiations of the user interface, the at least two display state definitions being associated with a display state variable of a first of a plurality of display stat dimensions, the display state variable being common to both, and each of the at least two display state definitions being associated with a different one of a plurality of discrete unequal display state values of the common display state variable, at least one display cell definition of one of the pluralities of display cell definitions having a transition rule that sets the common display state variables in response to user interaction with the display cell specified by the at least one display cell definition, said setting to facilitate determining by the client device a display state of the user interface, to determine a current display state of the user interface, and to provision a current instantiation of said user interface in accordance with one or more of the display state definitions associated with the determined current display state.

10. The article of claim 9, wherein said programming instructions equip said user interface provision function to perform said provisioning of the current instantiation of the user interface, by generating a portion of the current instantiation of the user interface with constituting contents inherited from a pseudo instantiation of the user interface.

11. The article of claim 9, wherein said current display state is multi-dimensional.

12. The article of claim 9, wherein the user interface provision function is a part of a selected one of a browser and an operating system.

13. The article of claim 9, wherein each of said plurality of display state definitions has one or more display cell definitions correspondingly defining one or more display cells of at least one instantiation of the user interface, and said programming instructions further equip said user interface provision function to make said determination in accordance with a second display cell definition of a second of the display state definitions of the user interface for a second rendered display cell of an immediately preceding instantiation of the user interface for corresponding to an immediately preceding display state of an immediately preceding instantiation of the user interface, with which corresponding display cell a user interacted, said second display cell definition including a state transition rule that sets at least one of one or more display state variables of the display state dimensions to at least one display state values to facilitate the client device in determining the current display state as the display state of the user interface in the event a user interacts with the corresponding second rendered display cell.

14. The article of claim 13, wherein said programming instructions further equip said user interface provision function to perform said provisioning of the current instantiation of the user interface, by generating a first display cell of the current instantiation of the user interface in accordance with a first of said one or more display cell definitions of one of said one or more display state definitions associated with said current display state.

15. The article of claim 14, wherein said programming instructions further equip said user interface provision function to perform said provisioning of the current instantiation of the user interface, by generating a second display cell of the current instantiation of the user interface in accordance with a second of said one or more display cell definitions of the same or another of said one or more display state definitions associated with said current display state.

16. A client device comprising:
a storage medium having stored therein a plurality of programming instructions to implement a user interface provision function equipped to receive from a remote server a plurality of display state definitions defining a plurality of instantiations of a user interface of an application for a plurality of display states of the user interface, wherein (1) at least one of the plurality of instantiations of the user interface corresponds to a multidimensional display state, that at least one instantiation defined by two or more of the plurality of display state definitions, and (2) at least two of the plurality of display state definitions including pluralities of display cell definitions correspondingly defining pluralities of display cells of at least one of the plurality of instantiations of the user interface, the at least two display state definitions being associated with a display state variable of a first of a plurality of display state dimensions, the display state variable being common to both, and each of the at least two display state definitions being associated with a different one of a plurality of discrete unequal display state values of the common display state variable, at least one display cell definition of one of the pluralities of display cell definitions having a transition rule that sets the display state variables in response to user interaction with the display cell specified by the at least one display cell definition, said setting to facilitate determining by the client device a display state of the user interface, to determine a current display state of the user interface, and to provision a current instantiation of said user interface in accordance with one or more of the display state definitions associated with the determined current display state; and
a processor coupled to the storage medium to execute the programming instructions.

17. The client device of claim 16, wherein said programming instructions equip said user interface provision function to perform said provisioning of the current instantiation of the user interface, by generating a portion of the current instantiation of the user interface with constituting contents inherited from a pseudo instantiation of the user interface.

18. The client device of claim 16, wherein said current display state is multi-dimensional.

19. The client device of claim 16, wherein the client device is a device selected from a group consisting of a wireless telephone, a palm sized computing device, and a notebook sized computing device.

20. The client device of claim 16, wherein each of said plurality of display state definitions has one or more display cell definitions correspondingly defining one or more display cells of at least one instantiation of the user interface, and said programming instructions further equip said user interface provision function to make said determination in accordance with a second display cell definition of a second of the display state definitions of the user interface for a second rendered display cell of an immediately preceding instantiation of the user interface for corresponding to an immediately preceding display state of an immediately preceding instantiation of the user interface, with which corresponding display cell a user interacted, said second display cell definition including a state transition rule that sets at least one of one or more display state variables of the display state dimensions to at least one display state values to facilitate the client device in determining the current display state as the display state of the user interface in the event a user interacts with the corresponding second rendered display cell.

21. The client device of claim 20, wherein said programming instructions further equip said user interface provision function to perform said provisioning of the current instantiation of the user interface, by generating a first display cell of the current instantiation of the user interface in accordance with a first of said one or more display cell definitions of one of said one or more display state definitions associated with said current display state.

22. The client device of claim 21, wherein said programming instructions further equip said user interface provision function to perform said provisioning of the current instantiation of the user interface, by generating a second display cell of the current instantiation of the user interface in accordance with a second of said one or more display cell definitions of the same or another of said one or more display state definitions associated with said current display state.

23. A server comprising:
a storage medium having stored therein a plurality of programming instructions to implement a user interface provision function equipped to transmit to a remote client device, a plurality of display state definitions defining a plurality of instantiations of a user interface of an application for a plurality of display states of the user interface, wherein (1) at least one of the plurality of instantiations of the user interface corresponds to a multidimensional display state, the at least one instantiation defined by two or more of the plurality of display state definitions, and (2) at least two of the plurality of display state definitions including pluralities of display cell definitions specifying constituting contents for pluralities of corresponding display cells of at least one of the plurality of instantiations of the user interface, the at least two display state definitions being associated with a display state variable of a first of a plurality of display state dimensions, the display state variable being common to both, and each of the at least two display state definitions being associated with a different one of a plurality of discrete unequal display state values of the common display state variable, at least one display cell definition of one of the pluralities of display cell definitions having a transition rule that sets the common display state variables in response to user interaction with the display cell specified by the at least one display call definitions, said setting to facilitate determining by the remote client device a display state of the user interface, and said constituting contents for said plurality of display cells for rendering an instantiation of the plurality of instantiations of said user interface on said remote client device in accordance with one of said pluralities of display cell definitions; and at least one processor coupled to the storage medium to execute the programming instructions.

24. The server of claim 23, wherein the constituting contents are constituting contents of a pseudo instantiation of the user interface to be inherited during said rendering.

* * * * *